United States Patent [19]

Christ, Jr. et al.

[11] Patent Number: 5,496,474
[45] Date of Patent: Mar. 5, 1996

[54] PROCESS OF RECOVERING SILVER FROM PHOTOGRAPHIC SOLUTIONS AND INHIBITING FORMATION OF UNDESIRABLE PRECIPITATE

[75] Inventors: Charles S. Christ, Jr., Fairport; Albert R. Szembrot, Penfield, both of N.Y.

[73] Assignee: Eastman Kodak Company, Rochester, N.Y.

[21] Appl. No.: 351,849

[22] Filed: Dec. 8, 1994

[51] Int. Cl.$^6$ .................. C02F 1/62; C02F 1/66
[52] U.S. Cl. .................. 210/725; 210/727; 210/912
[58] Field of Search .................. 210/724, 725, 210/726, 727, 912

[56] References Cited

U.S. PATENT DOCUMENTS 5,288,728  2/1994  Spears et al. .................. 210/729

Primary Examiner—Neil McCarthy
Attorney, Agent, or Firm—John R. Everett

[57] ABSTRACT

A process for inhibiting the formation of an unwanted precipitate comprising $[H_{2-n}TMT]Na_n[HNR_3]$ during the precipitation of silver mercapto-s-triazine (AgTMT) from a silver containing photoprocessing solution, comprising the steps of:

(a) providing a base solution;

(b) providing a reagent solution containing mercapto-s-triazine (TMT), or a water soluble salt thereof;

(c) mixing the TMT reagent solution with the photoprocessing solution; and (d) adding sufficent base to increase the pH of the mixture of the TMT reagent and photoprocessing solutions above the pH of the mixture before addition of base, and the base is mixed:

(i) directly to the photoprocessing solution before mixing TMT reagent with the photoprocessing solution; or (ii) with the photoprocessing solution concurrently with TMT reagent; or (iii) immediately after the point TMT reagent begins mixing with the photoprocessing solution.

6 Claims, 1 Drawing Sheet

PROCESS OF RECOVERING SILVER FROM PHOTOGRAPHIC SOLUTIONS AND INHIBITING FORMATION OF UNDESIRABLE PRECIPITATE

FIELD OF INVENTION

The present invention relates to recovering silver from photographic solutions.

BACKGROUND OF THE INVENTION

The commercial processing of photographic materials produces silver bearing photoprocessing solutions containing silver ions. Environmental regulations restrict the discharge of solutions containing silver to concentrations much less than the silver concentrations generally found in silver bearing photoprocessing solutions. Thus the silver concentrations in silver bearing photoprocessing solutions must be greatly reduced before discharge into the environment.

A much improved precipitation process for removal of silver from silver bearing photoprocessing solutions is disclosed in U.S. Pat. No. 5,288,728. The process is carried out in an apparatus having a number of inner surfaces. A mercapto-s-triazine compound, or a soluble salt there of, is used to precipitate silver inside the apparatus. The process and the apparatus are effective in recovering silver from the photoprocessing solutions. However, we discovered that an undesired precipitate forms during the procedure on the inner surfaces of the apparatus. The precipitate tends to stick steadfastly to tubing, filters and other parts of the apparatus. Such a precipitate will build up on the inner surfaces of the apparatus changing the preferred flow characteristics of the process and increasing the pressure necessary to move solution and desired silver precipitate through the apparatus to the collection point. In some cases, clogging of tubing has completely shut-down an apparatus. If the situation goes unnoticed a catastrophic failure may result in the spillage of the photoprocessing solution and loss of the Ag contained in the solution.

SUMMARY OF THE INVENTION

The formation of the undesired precipitate was completely unexpected. After substantial investigation we suspect, without limiting the present invention, that the undesired precipitate forms in photoprocessing solutions containing hexamethylenetetramine according to the following equation (1):

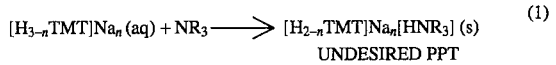
$$[H_{3-n}TMT]Na_n (aq) + NR_3 \longrightarrow [H_{2-n}TMT]Na_n[HNR_3] (s) \quad (1)$$
UNDESIRED PPT According to our research the undesired precipitate can be dissolved in a reasonable amount of time (minutes to hours) at a pH in excess of 9.7 according to equation (2):

$$OH^- + K^+ + [H_{2-n}TMT]Na_n[HNR_3] (s) \longrightarrow \quad (2)$$

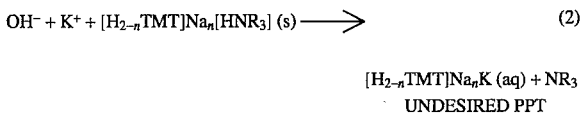
$$[H_{2-n}TMT]Na_nK (aq) + NR_3$$
UNDESIRED PPT

In equations (1) and (2) n is 1 or 2, (aq) indicates the material is dissolved in water, (s) indicates a solid, and $NR_3$ is hexamethylenetetramine (HMTA).

It would be advantageous to prevent build up of the undesired precipitate within the silver recovery apparatus. Accordingly the present invention provides a process for inhibiting the formation of an unwanted precipitate during the precipitation of silver mercapto-s-triazine (AgTMT) from a silver containing photoprocessing solution, comprising the steps of:

(a) providing a base solution;
(b) providing a reagent solution containing mercapto-s-triazine (TMT), or a water soluble salt thereof;
(c) mixing the TMT reagent solution with the photoprocessing solution; and
(d) adding sufficient base to increase the pH of the mixture of the TMT reagent and photoprocessing solutions above the pH of the mixture before addition of base, and the base is mixed:
  (i) directly to the photoprocessing solution before mixing TMT reagent with the photoprocessing solution; or
  (ii) with the photoprocessing solution concurrently with TMT reagent; or
  (iii) immediately after the point TMT reagent begins mixing with the photoprocessing solution.

DETAILED DESCRIPTION

Figure 1:
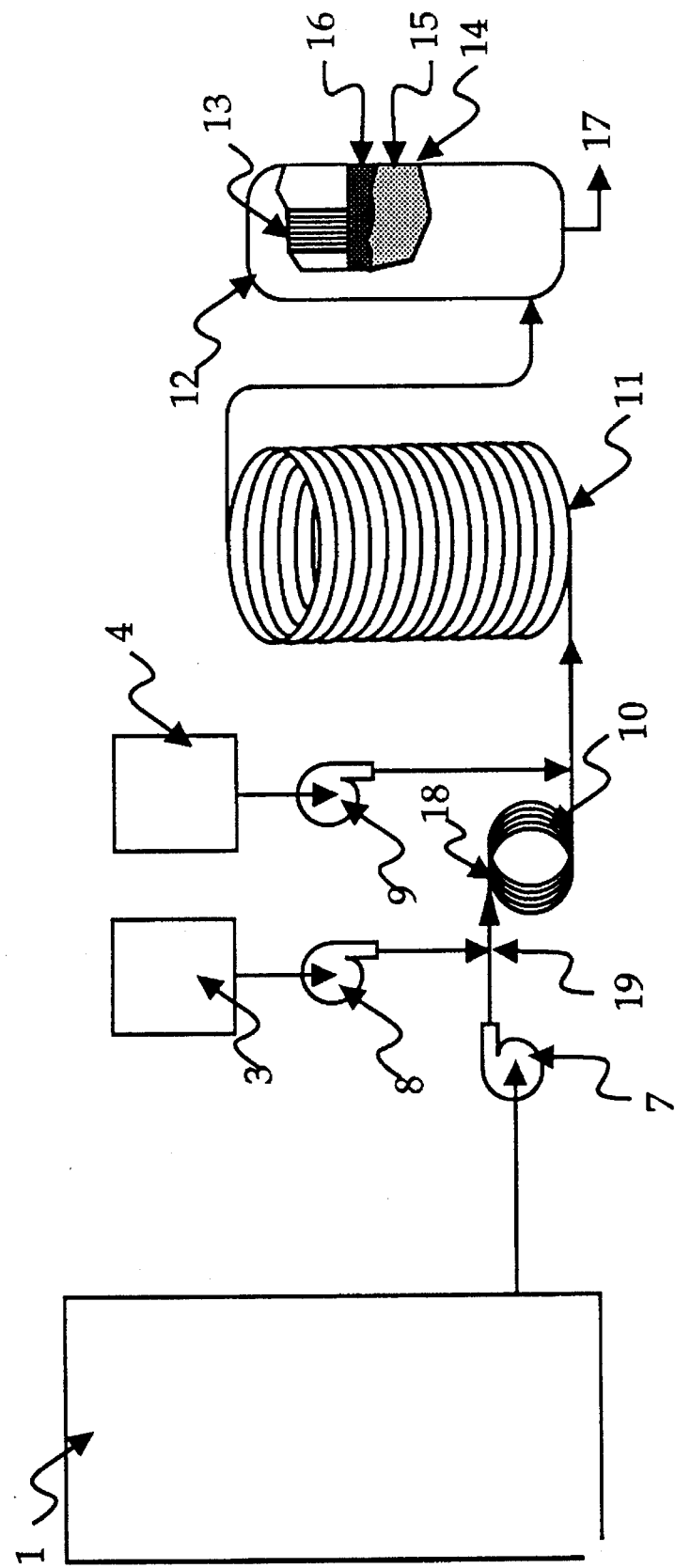
FIG. 1 presents an embodiment of an apparatus in which silver recovery is carried out.

Several factors effect the rate of formation of the undesired precipitate. Since the precipitate is formed from hexamethylenetetramine (HMTA) and TMT to give a 1:1 insoluble salt (see equation 1), the concentrations of the both HMTA and TMT will effect the rate and amount of precipitate formed. The precipitate is slow to form at low concentrations of the two salt components and at pH's between 8.3 and 9.7. The total amount of precipitate is limited by the lower molar concentration of the two components. In addition, the precipitate is known to dissolve in solutions that maintain a pH in excess of 9.7. The pH effect is related to the form of the TMT salt present in the mixture treated with the TMT reagent. Finally, time is an important factor in the formation of the undesired HMTA TMT precipitate. Thus, both thermodynamic and kinetic factors influence the formation of the undesired HMTA TMT precipitate.

Of the several factors that contribute to the formation of the undesired precipitate, only the pH of the treated silver bearing photoprocessing solution is easily manipulated. The treated solution pH can be controlled by the addition of base during the silver recovery process in one of several addition positions in the silver recovery apparatus and via one or a mixture of a number of different bases or buffer solutions.

The sensitivity of precipitate formation to the treated solution pH is related to concentration changes in two of the four possible forms of the TMT precipitant. Broadly, the starting pH range of the silver bearing solution before addition of TMT may be from pH 5 to pH 9. Often, the starting pH of the silver bearing solution is from a pH of 6 to a pH of 8. Broadly, after addition of TMT to the silver bearing solution and formation of the desired silver TMT salt, the pH range of the treated solution is shifted upward to a pH range between 5.5 and 9.5. In most cases the treated solution pH is in the range of pH 6.5 to pH 8.5. At pH's between 6.5 and 8.5, two forms of TMT predominate in the treated solution. TMT has three basic thiolate moieties that participate in the following equilibria in water (equations 3–5).

$$TMTNa_3 \text{ (aq)} + H_2O \longrightarrow HTMTNa_2 \text{ (aq)} + NaOH \text{ (aq)} \quad (3)$$
$$pK_b = 2.15$$

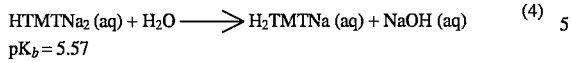

$$HTMTNa_2 \text{ (aq)} + H_2O \longrightarrow H_2TMTNa \text{ (aq)} + NaOH \text{ (aq)} \quad (4)$$
$$pK_b = 5.57$$

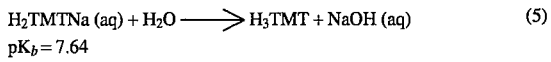

$$H_2TMTNa \text{ (aq)} + H_2O \longrightarrow H_3TMT + NaOH \text{ (aq)} \quad (5)$$
$$pK_b = 7.64$$

At any given pH, the relative percentage of each of the forms of TMT can be calculated using the $pK_b$ values given above. As described hereinabove typical pH's of silver bearing photoprocessing solutions treated with TMT are in the range of 6.5 to 8.5. In this pH range a dramatic change is observed in the amount of the doubly protonated form of TMT, $H_2TMTNa$ (aq).

The conditions that promote the formation of the HMTA TMT precipitate indicate that the $H_2TMTNa$ (aq) concentration plays a critical role in the formation of the undesired precipitate. Any increase in the pH of the treated solution by addition of base over that obtained with addition of TMT alone will inhibit the formation of the undesired precipitate.

At treated solution pH's above 8.7 the formation of the precipitate is slow and may not cause significant problems in the silver recovery apparatus. Unfortunately, typical pH's of the treated solutions are significantly lower than 8.7 and are most often in the range of 7.0 to 8.0. At a pH of 7.0 about 96% of the TMT is in the $H_2TMTNa$ (aq) form and as a result the formation of the undesired precipitate occurs readily. At a pH of 8.0 about 73% of the TMT is in the $H_2TMTNa$ (aq) form. The 25% reduction in $H_2TMTNa$ (aq) concentration at pH 8.0 inhibits the formation of the undesired HMTA TMT precipitate relative to pH 7.0. However, often the 25% reduction in $H_2TMTNa$ (aq) concentration is not enough to completely prevent the formation of undesired precipitate, but the increase in pH is advantageous for reducing undesired precipitate formation and, depending on the overall concentrations of HMTA and TMT, a pH of 8.0 may be sufficient to prevent the formation of the undesired precipitate in the silver recovery apparatus. At a pH of 8.4, only about 50% of the TMT is in the $H_2TMTNa$ (aq) form. The 50% reduction in the amount of $H_2TMTNa$ (aq) at pH 8.4 compared to pH 7.0 has a profound effect on the rate at which the undesired precipitate forms. At a pH of 8.5 the formation of the undesired precipitate is inhibited enough to prevent the majority of clogging problems to which this invention is targeted.

Broadly, the invention involves the addition of a basic component (e.g. KOH) to increase the pH of the mixture over that obtained with the use of TMT precipitating agent alone. Any increase in the pH of the mixture by addition of base over that obtained with addition of TMT alone will inhibit to some degree the formation of the undesired precipitate. The additive can be injected into the silver bearing photoprocessing solution before addition of TMT, with the TMT or shortly after the addition of TMT. Bases including alkali metal hydroxides (0.1–6M), carbonates (0.1M to 5M), phosphates (0.1 to 4M), and borates (0.1–3M) will inhibit the formation of the undesired precipitateto some extent by raising the final pH of the mixture compared to the pH obtained by treatment with TMT 15% alone. Since the undesired precipitate contains sodium, the use of non-sodium containing, e.g. potassium, salts of the above bases are preferred to avoid any common ion effect that would reduce the solubility of the undesired precipitate at a given pH and increase the its rate of formation. The efficacy of bases other than KOH depends on the extent to which the final mixture pH is increased above that obtained with the use of TMT 15% without added base.

If added to the TMT the pH of the TMT solution should be at least 12.4 and up to 14.8, which corresponds to KOH concentrations of at least 0.025M and up to 6M. Higher concentrations of base will also be effective to some extent, but handling of such highly basic solutions is undesirable due to safety concerns.

FIG. 1 and the following description illustrate how a silver recovery process is carried out before and after the invention.

Silver-bearing solutions to be treated by the apparatus are accumulated in the collection tank 1. During the silver recovery process this solution is pumped from the collection tank 1 through the system by pump 7. The TMT reagent, stored in feed tank 3, is injected into the silver-bearing solution at point 19 by pump 8 to form a mixture of the silver bearing solution and the TMT reagent. At this point 19 the silver-TMT precipitate begins to form. The mixture then enters a small coil of tubing 10 to provide residence time for the chemical precipitation reaction between the silver and TMT reagent. This coil reactor 10 consists of approximately 5 feet of 0.5 inch internal diameter flexible tubing wrapped in a 5-inch diameter coil, which is oriented to direct flow in a vertical plane. After the mixture exits the small coil 10 and before it enters the large coil 11, a flocculating reagent is pumped by pump 9 from feed tank 4 into the mixture. A suitable flocculating agent for removal of silver is a cationic copolymer of acrylamide and acryloyloxyethyl trimethyl ammonium chloride available from the Calgon Corporation as Product No. POL-E-Z-2406. After the addition of the flocculant, the mixture flows into a larger reactor coil 11. This reactor coil 11 consists of approximately 40 feet of 0.5-inch internal diameter tubing oriented in a horizontal, upward spiral configuration. The large reactor coil 11 provides the mixing and residence time necessary to promote the agglomeration of the precipitate particles. As the mixture exits the top of the coil 11, a well-defined two-phase system exists: a silver-rich solid phase immersed in a relatively particle-free liquid phase. This two-phase mixture enters the filter 12 whereby the liquid is separated from the solid phase. A cut-away view 14 of the filter 12 is depicted in FIG. 1 to reveal the solids 15 which accumulate in the filter 12. The liquid phase 16 passes through the filter media 13 and is discharged from the filter 12 through conduit 17.

As the above silver recovery process is operated, build up of the undesired precipitate on the inner surfaces of the described apparatus is noticeable. Over time build up of the precipitate adversely affects the recovery process and the apparatus as mentioned hereinbefore.

To inhibit the formation of TMT-HMTA precipitate which if allowed to form can adhere to the inner surfaces of the apparatus and adversely affect the performance of the apparatus, a means is provided to inject an additive into the silver-bearing solution during normal operation of the apparatus. The additives include alkali metal hydroxides, alkali metal carbonates, alkali metal phosphates, or combinations thereof. The additive must be injected into the solution before TMT addition, during TMT addition, or immediately following TMT addition. Consequently, one embodiment of the invention is to add the additive directly to the solution accumulated in collection tank 1. Alternately, the solution could be injected continuously into the process stream during treatment in the apparatus. If this technique is chosen, the injection point should be located between points 19 and 18 depicted in FIG. 1. An additional feed tank and pump (not shown) similar to tank 3 and pump 8 would be required. A third and preferred technique, is to add the additive to the TMT reagent and utilize tank 3 and pump 8 to provide both the TMT reagent and the additive for injection into the system at point 19.

EXAMPLE 1

In a typical example of the invention a comparison was made between the process of U.S. Pat. No. 5,288,728 in the apparatus described in FIG. 1 and the method of the present invention. A 15% solution of TMT and a flocculating agent were used.

To provide a direct comparison three identical silver recovery systems were constructed. Each system included three pumps which enabled the metered flow of the silver bearing photoprocessing solution, the TMT precipitating agent, and the flocculating agent through two reactor coils in series. The first, smaller reactor coil consisted of approximately 5 feet of 0.5-inch (12.7 mm) internal diameter flexible tubing wrapped in a 5-inch (12.7 cm) diameter coil, which was oriented to direct flow in a vertical plane. The second, larger reactor coil consisted of approximately 40 feet (12.2 meters) of 0.5-inch (12.7 mm) internal diameter flexible tubing wrapped in a 10-inch (25.4 cm) diameter coil, which was oriented in a horizontal, upward spiral configuration. The minilab silver bearing photoprocessing solution was pumped through the system at 200 milliliters per minute. The TMT precipitating agent was injected into the silver bearing photoprocessing solution at the inlet to the smaller reactor coil at a rate of 5 milliliters per minute. The flocculating agent was injected into the mixture at the outlet of the smaller coil, just upstream of the larger reactor coil.

Each of the three systems were operated 1 hour per day for nine consecutive days. The minilab silver bearing photoprocessing solution was spiked to 32% film stabilizer to promote the formation of the undesired precipitate.

The operating conditions of the three systems were differentiated as described below:

1. In system 1 the process described hereinabove according to U.S. Pat. No. 5,288,728 including use of the flocculants described herein. The starting silver bearing photoprocessing solution pH was 6.88. The starting TMT reagent pH was 12.7. The pH of the mixture after addition of TMT was 8.02.
2. System 2 was identical to system 1 except that a TMT solution containing 1M KOH (pH 14) was employed. Here again the pH of the starting silver bearing photoprocessing solution pH was 6.88. The pH of the mixture after addition of the TMT solution containing 1M KOH was 8.43.
3. System 3 was identical to system 2 employing 0.5M KOH in the TMT solution. The pH of the TMT solution was 13.7. The pH of the starting silver bearin photoprocessing solution was 6.88. The pH of the mixture after addition of the TMT solution containing 0.5M KOH was 8.35.

Within the first two days of operation, a significant amount of the undesired precipitate had formed and adhered to the tubing in System 1. The amount of undesirable precipitate coated on the tubing continued to increase throughout the test. In fact, by the end of the test, it was impossible to see through large portions of the originally clear tubing. In contrast, after the full nine days of operation, after which the experiment was ended, the undesirable precipitate was undetectable in System 2 or System 3, indicating that both levels of KOH (0.5 and 1.0M) inhibited the formation of this precipitate. It was also observed that the addition of the KOH did not adversely affect the overall system performance.

As described above, one of several different bases or a mixture of bases may be used to increase the final pH of the mixture. For the example, we chose to use KOH, which was added to the TMT reagent to give KOH concentrations between 0.5M and 1M. The TMT reagent was chosen as a vehicle for addition of the KOH to the silver bearing photoprocessing solution for convenience, since no additional pumps or fittings are needed.

Bases including alkali metal hydroxides (0.1–6M), carbonates (0.1M to 5M), phosphates (0.1 to 4 M), and borates (0.1M–3M) will inhibit the formation of the undesired precipitate by raising the final pH of the mixture compared to the pH obtained by treatment with TMT 15% alone. Since the undesired precipitate contains sodium, the use of non-sodium containing, e.g. potassium, salts of the above bases are preferred to avoid any common ion effect that would reduce the solubility of the undesired precipitate at a given pH and increase the its rate of formation. The efficacy of bases other than KOH depends on the extent to which the final mixture pH is increased above that obtained with the use of TMT 15% without added base.

The invention has been described in detail with particular reference to preferred embodiments thereof, but it will be understood that variations and modifications can be effected within the spirit and scope of the statement.

EXAMPLE 2

To provide a direct comparison, a TMT solution, a TMT solution with added $K_2CO_3$, and a TMT solution with added $K_3PO_4$ were used to treat minilab silver bearing photoprocessing solution. The minilab silver bearing photoprocessing solution was spiked to 32% film stabilizer before addition of any of the TMT solutions to promote the formation of the undesired precipitate. The treated solutions were monitored to determine if a reduction in the undesirable precipitate was observed. The experiments were conducted in beakers with solution volumes of about 1 liter. A description of each of the trials is given below:

1. 1 liter of spiked minilab silver bearing photoprocessing solution was placed in a glass container and 25 ml of TMT 15% was added. A yellow precipitate of silver TMT was formed immediately and allowed to settle to the bottom of the container. The starting pH of the minilab silver bearing photoprocessing solution before addition of TMT was 7.34. After addition of TMT 15% the pH of the treated solution was 7.77. After approximately 24 hrs a small amount of the undesired white precipitate was observed floating on the surface of the treated solution. After 36 hrs, the undesired white precipitate was observed on the walls of the glass container beneath the surface of the mixture.
2. 1 liter of spiked minilab silver bearing photoprocessing solution was placed in a glass container and 25 ml of TMT 15% containing 1M $K_2CO_3$ was added. A yellow precipitate of silver TMT was formed immediately and allowed to settle to the bottom of the container. The starting pH of the minilab silver bearing photoprocessing solution before addition of TMT was 7.34. After addition of TMT 15% containing 1M $K_2CO_3$ the pH of the treated solutions was 8.08. After 36 hrs none of the undesired precipitate was observed on the walls of the container or on the surface of the mixture.

3. 1 liter of spiked minilab silver bearing photoprocessing solution was placed in a glass container and 25 ml of TMT 15% containing 1M $K_3PO_4$ was added. A yellow precipitate of silver TMT was formed immediately and allowed to settle to the bottom of the container. The starting pH of the minilab silver bearing photoprocessing solution before addition of TMT was 7.34. After addition of TMT 15% containing 1M $K_3PO_4$ the pH of the mixture was 8.16. After 36 hrs none of the undesired precipitate was observed on the walls of the container or on the surface of the mixture.

Even though the experiment was not conducted in the silver recovery apparatus, the results clearly show the inhibiting effect of added bases in preventing the formation of the undesired HMTA TMT precipitate.

The invention has been described in detail with particular reference to preferred embodiments thereof, but it will be understood that variations and modifications can be effected within the spirit and scope of the invention.

We claim:

1. A process for inhibiting the formation of an unwanted precipitate comprising $[H_{2-n}TMT]Na_n[HNR_3]$ on the inner surfaces of an apparatus, during precipitation in said apparatus of silver mercapto-s-triazine (AgTMT) from a silver containing photoprocessing solution, wherein said process comprises the steps of:

(a) providing an apparatus having inner surfaces;

(b) pumping the silver containing photoprocessing solution into the apparatus;

(c) pumping TMT reagent into the silver containing photoprocessing solution within the apparatus, to mix the silver containing photoprocessing solution and the TMT reagent, thereby forming AgTMT precipitate;

(d) adding sufficient base to increase the pH of the mixture of the TMT reagent and photoprocessing solution in the apparatus above the pH of the mixture, before addition of base, said added base being mixed:

(i) directly to the photoprocessing solution before mixing TMT reagent with the photoprocessing solution; or (ii) with the photoprocessing solution concurrently with TMT reagent; or (iii) immediately after the point TMT reagent begins mixing with the photoprocessing solution.

2. The process according to claim 1 wherein the pH is adjusted with a base selected from the group consisting of alkali metal hydroxides, alkali metal carbonates, alkali metal phosphates and alkali metal borates.

3. The process of claim 1 wherein the pH of the mixture of TMT reagent and the photoprocessing solutions is increased to about 9.8 by addition of the base.

4. The process of claim 1 wherein the pH of the mixture of TMT reagent and the photoprocessing solutions is increased up to about 8.5 by addition of the base.

5. The process of claim 1 wherein the KOH concentration is 0.4 to 0.6M.

6. The process of claim 2 wherein the base is selected from the group consisting of KOH, $K_2CO_3$, and $K_3PO_4$.

* * * * *